(12) United States Patent
Tisserand et al.

(10) Patent No.: US 9,525,370 B2
(45) Date of Patent: Dec. 20, 2016

(54) TWO-PHASE DUTY CYCLE CONTROL FOR MOTOR VEHICLE ALTERNATOR COMBINING STEPWISE AND PROGRESSIVE RESPONSE FOR PREVENTING ENGINE STALL

(75) Inventors: Pierre Tisserand, Limeil Brevannes (FR); Pierre Chassard, Creteil (FR)

(73) Assignee: Valeo Equipements Electriques Moteur (FR)

( * ) Notice: Subject to any disclaimer, the term of this patent is extended or adjusted under 35 U.S.C. 154(b) by 1336 days.

(21) Appl. No.: 13/001,103

(22) PCT Filed: May 27, 2009

(86) PCT No.: PCT/FR2009/050989
§ 371 (c)(1),
(2), (4) Date: Mar. 29, 2012

(87) PCT Pub. No.: WO2010/000997
PCT Pub. Date: Jan. 7, 2010

(65) Prior Publication Data
US 2012/0176100 A1 Jul. 12, 2012

(30) Foreign Application Priority Data
Jul. 2, 2008 (FR) ...................................... 08 54473

(51) Int. Cl.
*H02P 9/10* (2006.01)
*H02P 6/14* (2016.01)
(52) U.S. Cl.
CPC ...................................... *H02P 6/14* (2013.01)

(58) Field of Classification Search
CPC ...................................................... H02P 6/14
See application file for complete search history.

(56) References Cited

U.S. PATENT DOCUMENTS 4,789,817 A * 12/1988 Asakura et al. ................ 322/28
5,043,911 A * 8/1991 Rashid .......................... 700/287
(Continued)

FOREIGN PATENT DOCUMENTS

EP 0 106 539 4/1984
EP 0 201 243 11/1986
(Continued)

*Primary Examiner* — Tulsidas C Patel
*Assistant Examiner* — S. Mikailoff
(74) *Attorney, Agent, or Firm* — Berenato & White, LLC

(57) ABSTRACT

A method for controlling an alternator or alternator-starter of a motor vehicle, the electric machine being capable of providing an electric current, the strength of which varies on the basis of the excitation signal (EXC). A duty cycle is associated with each excitation signal. The method includes comparing the difference between the duty cycle values of two consecutive excitation signals at a predetermined threshold. If the difference is greater than the predetermined threshold, a gradual response phase is released, during which the duty cycle of the excitation signals is gradually increased, particularly in a substantially linear manner. At the start of the gradual response phase, the duty cycle of the consecutive excitation signals is increased by a predetermined jump (D,B), then the duty cycle is gradually increased. The duty cycle jump at the start of the gradual response phase being less than or equal to the release threshold of the gradual response phase.

8 Claims, 4 Drawing Sheets

(56) References Cited

U.S. PATENT DOCUMENTS

| | | | |
|---|---|---|---|
| 5,319,299 A * | 6/1994 | Maehara | 322/28 |
| 6,064,186 A * | 5/2000 | Pierret et al. | 322/28 |
| 6,107,775 A * | 8/2000 | Rice | F02N 11/04 |
| | | | 318/140 |
| 6,137,247 A * | 10/2000 | Maehara | H02J 7/1446 |
| | | | 318/140 |
| 8,164,867 B2 * | 4/2012 | Tisserand et al. | 361/21 |
| 2007/0268003 A1 * | 11/2007 | Kolomeitsev | H02H 7/06 |
| | | | 322/33 |
| 2012/0032650 A1 * | 2/2012 | Chassard et al. | 322/44 |
| 2014/0125296 A1 * | 5/2014 | Chassard et al. | 322/22 |

FOREIGN PATENT DOCUMENTS

| | | |
|---|---|---|
| EP | 0 421 332 | 4/1991 |
| EP | 0 611 215 | 8/1994 |
| FR | 2803447 | 7/2001 |

\* cited by examiner

TWO-PHASE DUTY CYCLE CONTROL FOR MOTOR VEHICLE ALTERNATOR COMBINING STEPWISE AND PROGRESSIVE RESPONSE FOR PREVENTING ENGINE STALL

FIELD OF THE INVENTION

The invention relates in particular to a method for controlling a rotary electrical machine, in particular an alternator or an alternator-starter of a motor vehicle, and a device for implementation of a method of this type.

BACKGROUND OF THE INVENTION

A system is known from patent application FR 2 803 447 for generation of power for a motor vehicle on-board network. This system comprises a three-phase alternator which is associated with a three-phase inverter. Electronic control means carry out the voltage regulation by modulation of the control pulse width.

In general, and in particular in systems of the aforementioned type, it is necessary to maintain the voltage of the on-board network at a required value, for example at approximately 14 Volts.

When the motor vehicle is at a standstill (combustion engine running), the alternator rotates at a reduced speed, for example at approximately 800 rpm, in order to minimise the fuel consumption.

A substantial requirement for electric charge, in particular as a result of switching on an electrical apparatus of the on-board network, such as the air-conditioning system, then gives rise to a requirement for torque which can be excessive, and can cause the combustion engine to stall.

In order to avoid an excessive requirement for torque which can provoke stalling of the combustion engine, the alternator is controlled so as to increase the output current of the alternator, firstly according to a step or jump selected in order to supply a sufficient minimum current in a controlled manner at the moment of the requirement for charge, then progressively according to a certain gradient, until the regulation voltage required in order to satisfy the requirement for charge is reached.

SUMMARY OF THE INVENTION

The object of the invention is in particular to improve the control of a rotary electrical machine in the above-described context.

The object of the invention is thus a method for controlling a rotary electrical machine, in particular an alternator or an alternator-starter of a motor vehicle, the electrical machine being capable of supplying an electric current, the intensity of the electric current varies according to the excitation signals, a duty cycle being associated with each excitation signal, and the method comprising the following steps:
  comparing the difference between the duty cycle values of the consecutive excitation signals with a predetermined threshold; and
  if the said difference is higher than the predetermined threshold, triggering a progressive response phase during which the duty cycle of the excitation signals is increased progressively, and in particular in a substantially linear manner.

By means of the invention, the control of the rotary electrical machine can be based, if applicable, on digital processing of the data (in particular of the excitation signals), which can be better than analogue processing, using for example a voltage drop value at the terminals of the machine.

The progressive response phase makes it possible to increase the excitation current of the rotor substantially linearly, in order to control the output current of the alternator, and consequently the moment.

The threshold of triggering of the progressive response phase is preferably selected to be high enough to avoid triggering of the progressive response phase as a result of a noise which affects the excitation signals.

This threshold can also be selected according to the specifications of a motor vehicle manufacturer.

Preferably, the method according to the invention comprises the following steps:
  at the beginning of the progressive response phase, increasing the duty cycle of consecutive excitation signals by a predetermined jump;
  then increasing the duty cycle progressively.

If applicable, the duty cycle can have zero amplitude.

By means of the invention, the threshold of triggering of the progressive response phase and the duty cycle jump at the beginning of this phase can be uncoupled, such that it is possible, if required, to improve the regulation of the torque on the vehicle.

Preferably, the duty cycle jump at the beginning of the progressive response phase is lower than, or equal to, the threshold of triggering of the progressive response phase.

For example, the threshold of triggering can be fixed at 10%, and the duty cycle jump can be fixed at 7%.

The duty cycle jump can be fixed, or, as a variant, it can be variable, for example according to needs of the on-board network.

The duty cycle jump at the beginning of the progressive response phase is for example less than $4/5$, and in particular less than $1/2$, of the threshold of triggering of the progressive response phase.

According to one embodiment of the invention, the threshold of triggering of the progressive response phase corresponds to an increase of at least 10%, and in particular 20%, of the duty cycle between two consecutive excitation signals.

Since the rotary electrical machine is connected electrically to at least one electrical apparatus, the method can comprise the following steps:
  increasing the duty cycle of the excitation signals when a charge requirement in order to supply the electrical apparatus is detected;
  comparing the difference between the duty cycle values of two consecutive excitation signals thus increased during the preceding step, with the predetermined threshold of triggering of the progressive response phase.

According to one embodiment of the invention, the method comprises the following steps:
  detecting a positive difference between the duty cycle values of two consecutive excitation signals, this difference being lower than the threshold of triggering of the progressive response phase, then;
  increasing the duty cycle of a jump corresponding to the positive difference, without triggering the progressive response phase.

Since the rotary electrical machine is associated with an internal combustion engine of a motor vehicle, the progressive response phase is advantageously triggered only when the rotary electrical machine is functioning in idling mode.

If required, the excitation signals which are used for the comparison with the threshold of triggering of the progressive response phase are obtained from a filter, and in particular a low-pass filter.

This makes it possible to obtain an accurate and reliable comparison.

The object of the invention is also a device for controlling a rotary electrical machine, in particular an alternator or an alternator-starter of a motor vehicle, the electrical machine being capable of supplying an electric current, the electric current varies according to the excitation signals supplied by the control device, a duty cycle being associated with each excitation signal, the device being designed to compare the difference between the duty cycle values of two consecutive excitation signals with a predetermined threshold, and, if the said difference is higher than the predetermined threshold, initiating a progressive response phase during which the duty cycle of the excitation signals is increased progressively.

According to one embodiment of the invention, the device comprises a differential amplifier which is designed to provide error information which is representative of the difference between a set-point and a voltage value at a terminal of the rotary electrical machine.

If applicable, the device comprises an excitation signal generator which is designed to provide excitation signals, and the duty cycle of excitation signals varies, in particular according to the error information provided by a differential amplifier.

Advantageously, the device comprises a module which is designed to compare the difference between the duty cycle values of two consecutive excitation signals obtained from the signal generator, with the predetermined threshold, and, if the said difference is higher than the predetermined threshold, to initiate a progressive response phase during which the duty cycle of the excitation signals is increased progressively.

According to one embodiment of the invention, the module is designed to control a multiplexer such as:
- if the difference between the duty cycle values of two consecutive excitation signals obtained from the signal generator is higher than the threshold of triggering of the progressive response phase, to control the multiplexer such that the multiplexer permits triggering of the progressive response phase;
- if the difference between the duty cycle values of two consecutive excitation signals obtained from the signal generator is lower than the threshold of triggering of the progressive response phase, to control the multiplexer such that the multiplexer permits normal regulation of the alternator.

If required, the device comprises a power stage which is downstream from the multiplexer, and is connected to the rotary electrical machine in order to control the latter, in particular by acting on the excitation of the rotor of the machine, according to the excitation signals supplied by the multiplexer.

BRIEF DESCRIPTION OF THE DRAWINGS

The invention will be able to be better understood by reading the following detailed description of a non-limiting embodiment of it, and by examining the attached drawing, in which.

DETAILED DESCRIPTION

Figure 1:
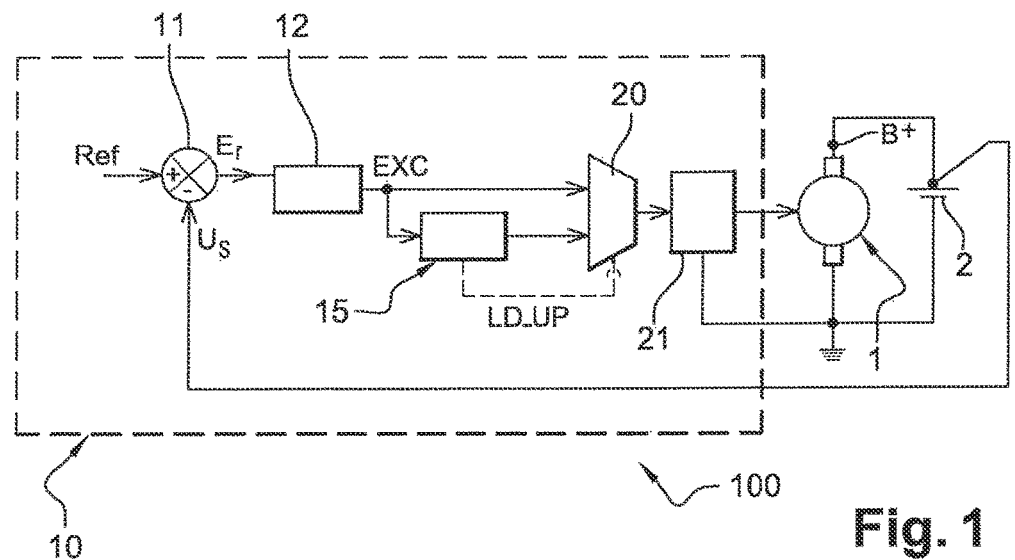
FIG. 1 represents schematically and partially a device according to the invention, associated with a rotary electrical machine.

FIG. 1 shows an assembly 100 for a motor vehicle comprising a polyphase rotary electrical machine 1, which is formed by an alternator in the example concerned.

This alternator 1 can be rotated by an internal combustion engine of the motor vehicle, in order to produce electrical energy.

In a known manner, the alternator 1 comprises firstly a stator comprising windings, which in the example described form three phases, and secondly a rotor comprising an excitation winding.

As a variant, the machine 1 can be an alternator-starter.

The alternator 1 is connected to a battery 2 on board the vehicle.

The assembly 100 additionally comprises a device 10 to control the alternator 1, which can supply an electric current, the intensity of the electric current varies according to excitation signals or excitation pulses EXC generated by this control device 10, including an excitation signal EXC1 and an excitation signal EXC2.

A duty cycle DC is associated with each excitation signal EXC. Specifically, a duty cycle DC1 is associated with the excitation signal EXC1, while a duty cycle DC2 is associated with the excitation signal EXC2.

Figure 3:
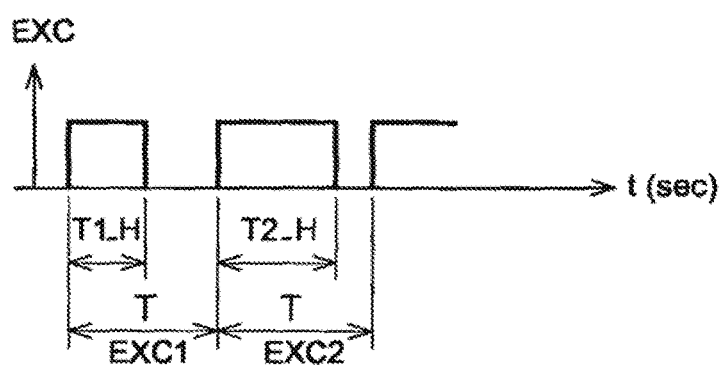
FIG. 3 illustrates schematically excitation signals generated by the device in FIG. 1.
Figure 4:
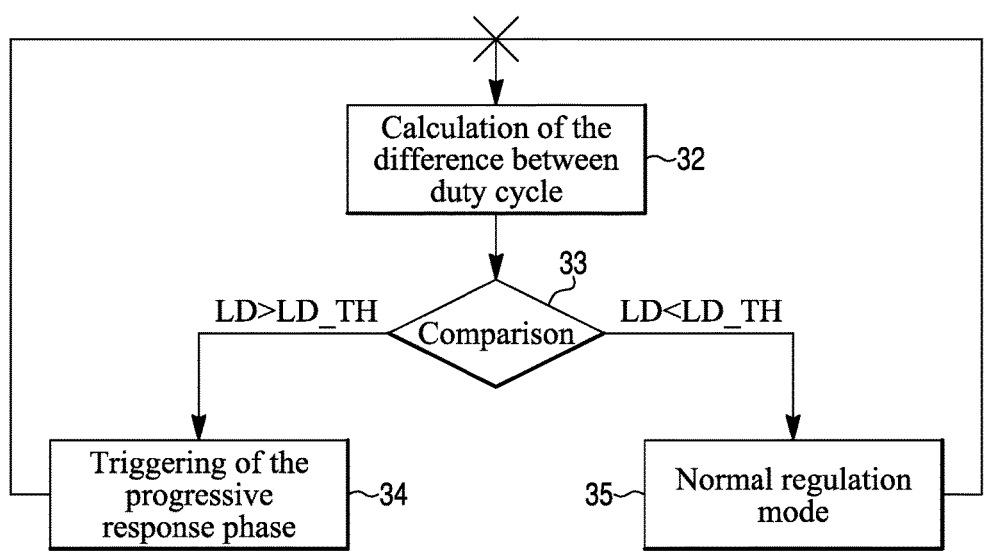
FIG. 4 is a flowchart illustrating different steps of the method implemented in the device in FIG. 1.

FIG. 3 shows excitation signals EXC.

The duty cycle DC of each of the excitation signals EXC is provided respectively by the ratio:

The duty cycle $DC1=(T1\_H/T)*100$, where T is the period of the excitation signal EXC1 and $T1\_H$ is the duration for which the amplitude of the excitation signal EXC1 is high.

The duty cycle $DC2=(T2\_H/T)*100$, where T is the period of the excitation signal EXC2 which is identical to that of the signal EXC1, and $T2\_H$ is the time during which the amplitude of the excitation signal EXC2 is high.

LD designates the difference between duty cycle values of two consecutive excitation signals or excitation pulses EXC1 and EXC2.

Thus $LD(\%)=DC2-DC1$

The device 10 comprises a differential amplifier 11 which is designed to provide error information Er which is representative of the difference between a set-point Ref and a voltage value Us at a terminal B+ of the alternator 1, which terminal is connected to the battery 2.

The device 10 additionally comprises an excitation signal generator 12 which is designed to provide the excitation signals EXC, the duty cycle DC of each of the excitation signals varies according to error information Er supplied by the differential amplifier 11.

The generator 12 is of the PWM (pulse width modulation type).

A module 15 is provided in the control device 10 in order to compare the difference LD between values the duty cycles DC1 and DC2 of two consecutive excitation signals EXC1 and EXC2 obtained from the signal generator 12, with a predetermined threshold LD_TH, and, if the difference LD is higher than the threshold LD_TH, to initiate a progressive response phase during which the duty cycle of the excitation signals EXC is increased progressively.

Figure 2:
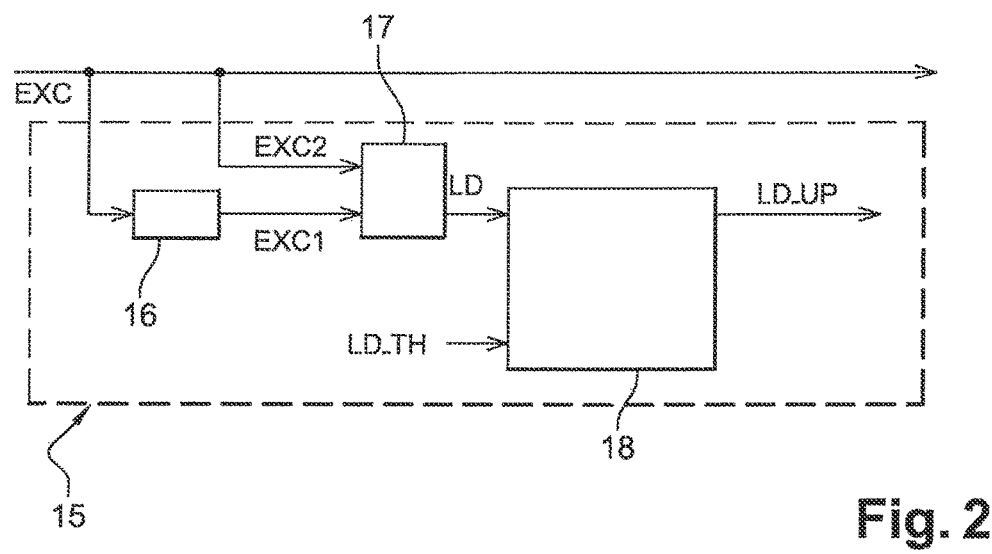
FIG. 2 represents schematically and partially elements of the device in FIG. 1.

As can be seen in FIG. 2, the module 15 comprises a memory 16 in order to store data associated with the signal EXC1, and a subtractor 17 to provide information which is representative of the difference LD obtained from successive signals EXC1 obtained from the memory 16, and EXC2.

The module 15 is provided with a comparator 18 in order to compare the difference LD with the predetermined threshold LD_TH and provide a signal LD_UP which represents a difference LD which is higher than the threshold LD_TH.

As can be seen in FIG. 1, the module 15 is designed to control a multiplexer 20 of the device 10, such as:

if the comparator 18 detects a difference LD which is higher than the threshold LD_TH of triggering of a progressive response phase during which the duty cycle of the excitation signals is increased progressively, to control the multiplexer 20 by means of the signal LD_UP, such that the latter permits triggering of the progressive response phase;

if the difference LD is lower than the threshold LD_TH of triggering of a progressive response phase, controlling the multiplexer 20 such that the multiplexer permits normal regulation of the alternator 1.

A power stage 21 downstream from the multiplexer 20 is connected to the alternator 1 in order to control the latter by acting on the excitation of the rotor of the machine, according to the excitation signals supplied by the multiplexer 20.

The multiplexer 20 makes it possible to allow passage selectively of the signals obtained from the module 15, or directly from the generator 12.

A description will now be given in greater detail of different steps of the functioning of the device 10.

Let us consider the device 10 in a state of normal regulation.

Let us also consider a requirement for charge generated for example by the starting up of an air-conditioning system of the motor vehicle.

In the step 32, the device 10, as previously described, determines the difference LD between consecutive excitation signals and, in the step 33, compares this difference LD with the threshold LD_TH.

If the value LD is higher than the threshold LD_TH, the device 10 triggers the progressive response phase (step 34). This phase is described in greater detail with reference to FIG. 5.

The threshold LD_TH of triggering of the progressive response phase is preferably selected to be high enough to avoid triggering of the progressive response phase as the result of a noise which affects the excitation signals EXC.

On the other hand, when the value LD is lower than the threshold LD_TH, the device 10 does not trigger the progressive response phase, and the device 10 regulates the alternator 1 normally (step 35), as will be seen hereinafter with reference to FIG. 6.

Figure 5:
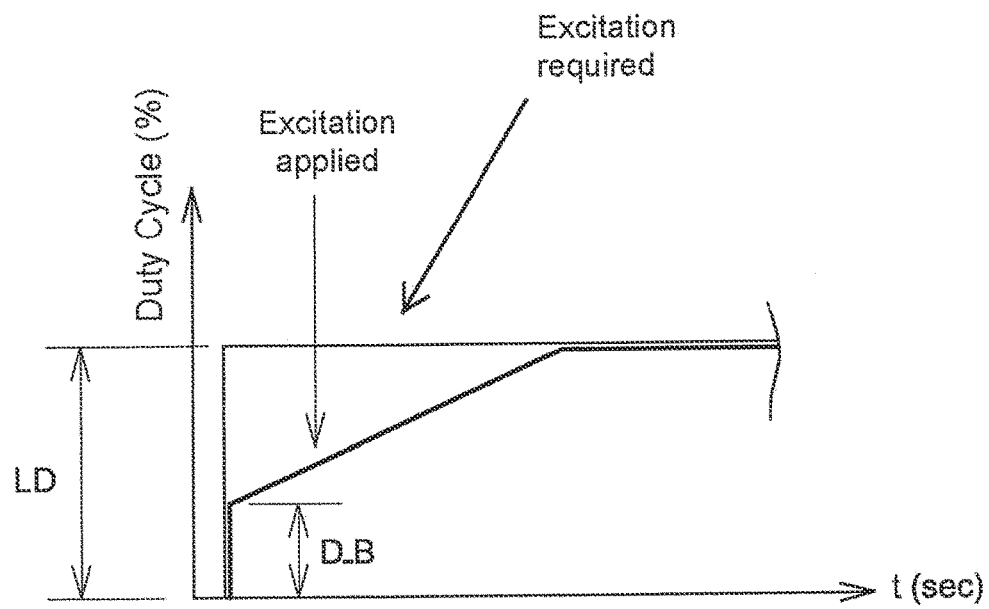
FIGS. 5 and 6 illustrate the variation of the duty cycle of excitation signals as a function of time, for two functioning modes of the device in FIG. 1.

As illustrated in FIG. 5, at the beginning of the progressive response phase (case in which the excitation needed requires an increase in the duty cycle which is greater than LD_TH), the duty cycle of consecutive excitation signals EXC is increased by a predetermined jump with a rate D_B in order to increase the excitation in the rotor of the alternator 1, and consequently the current supplied by the alternator 1, then the duty cycle of the signals EXC, is increased progressively according to a non-vertical substantially linear gradient, such that the alternator 10 supplies a current required in order to meet the need for charge.

The threshold LD_TH of triggering of the progressive response phase and the duty cycle jump D_B at the beginning of this phase can be uncoupled, such that it is possible to select the amplitude of the duty cycle jump easily, with fewer constraints.

For example, the threshold of triggering LD_TH can be fixed at 10% or 20%, and the duty cycle jump can be fixed at 7% or 15% respectively.

Figure 6:
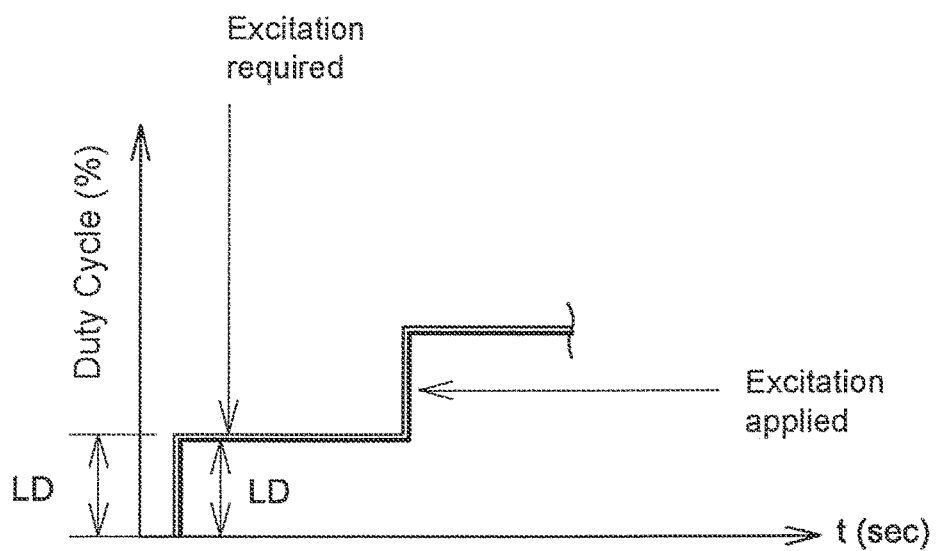

As illustrated in FIG. 6, when the difference LD is lower than the threshold LD_TH of triggering of the progressive response phase, the duty cycle is increased by a jump LD corresponding to the difference LD, without triggering the progressive response phase.

The progressive response phase advantageously ends when the voltage at the terminals of the vehicle battery reaches the regulation voltage required.

The invention claimed is:

1. A control device, for controlling an alternator or an alternator-starter of a motor vehicle, the control device supplying excitation signals so as to vary an electric current generated by said alternator or alternator-starter according to the excitation signals supplied by the control device, the control device comprising:

an excitation signal generator (12), a duty cycle being associated with each excitation signal supplied by said excitation signal generator in said control device;

a module (15) configured to compute a difference (LD) between duty cycle values of two consecutive supplied excitation signals from said excitation signal generator and compare the difference (LD) with a predetermined threshold (LD_TH), and, if the difference is higher than the predetermined threshold, initiate a progressive response phase during which the duty cycle of the excitation signals supplied by said control device to said alternator or alternator-starter is increased incrementally; and, further comprising a multiplexer (20) connected to both an output of the module (15) and to an output of the excitation signal generator (12), and wherein the module is configured to control the multiplexer (20) such that the multiplexer prohibits initiation of the progressive response phase where the difference between the duty cycle values of two consecutive excitation signals obtained from the signal generator is lower than the predetermined threshold of initiation of the progressive response phase, such that the multiplexer (20) permits normal regulation of the alternator or the alternator-starter.

2. The device according to claim 1, further comprising a differential amplifier (11) configured to detect error information representative of a difference between a set-point and a voltage value (Us) at a terminal of the alternator or the alternator-starter.

3. The device according to claim 2, wherein the duty cycle of each of the excitation signals varies according to the error information (Er) detected by the differential amplifier.

4. The device according to claim 1, further comprising a power stage (21) connected to both an output of the multiplexer (20) and to the alternator or the alternator-starter in order to control the alternator or the alternator-starter by providing an excitation of a rotor of the alternator or the alternator-starter, according to the excitation signals supplied by the multiplexer.

5. A control device for supplying excitation signals to an alternator or an alternator-starter of a motor vehicle so as to vary an electric current generated by said alternator or said alternator-starter, the alternator or the alternator-starter having a rotor and being capable of generating said electric current, the control device comprising:

an excitation signal generator (12), a duty cycle being associated with each excitation signal provided by said excitation signal generator (12);

a module (15) configured to compute a difference (LD) between duty cycle values of two consecutive excitation signals and compare the difference with a predetermined threshold (LD_TH), and, if the difference is higher than the predetermined threshold, initiate a progressive response phase during which the duty cycle of the excitation signals is increased incrementally; and, a multiplexer (20) connected to an output of the module (15) and to an output of the excitation signal generator (12), wherein the module (15) is configured to control said multiplexer (20) so that:

if the difference between the duty cycle values of the two consecutive excitation signals obtained from the excitation signal generator (12) is higher than the predetermined threshold for initiating the progressive response phase, to control the multiplexer (20) such that the multiplexer permits initiating of the progressive response phase; and if the difference between the duty cycle values of the two consecutive excitation signals obtained from the excitation signal generator (12) is lower than the predetermined threshold for initiating the progressive response phase, to control the multiplexer (20) such that the multiplexer permits normal regulation of the alternator or the alternator-starter.

6. The control device according to claim 5, further comprising a differential amplifier (11) configured to provide an detect error information representative of a difference between a set-point and a voltage value (Us) at a terminal of the alternator or the alternator-starter.

7. The control device according to claim 6, wherein the duty cycle of each of the excitation signals varies according to the error information detected by the differential amplifier.

8. The control device according to claim 5, further comprising a power stage (21) connected between an output of the multiplexer (20) and an input of the rotor of the alternator or the alternator-starter in order to control the alternator or the alternator-starter, according to the excitation signals supplied by the multiplexer.

* * * * *